June 9, 1964     E. KAISER     3,136,179
MULTIPLE SPEED HUB

Filed Nov. 5, 1962     2 Sheets-Sheet 1

INVENTOR
Ewald Kaiser

June 9, 1964     E. KAISER     3,136,179
MULTIPLE SPEED HUB

Filed Nov. 5, 1962     2 Sheets—Sheet 2

INVENTOR
Ewald Kaiser

By Richard Low
Agt

United States Patent Office 3,136,179
Patented June 9, 1964

3,136,179
MULTIPLE SPEED HUB
Ewald Kaiser, Stuttgart-Hedelfingen, Germany, assignor to Fichtel & Sachs A.G., Schweinfurt (Main), Germany, a corporation of Germany
Filed Nov. 5, 1962, Ser. No. 235,417
Claims priority, application Germany Nov. 11, 1961
12 Claims. (Cl. 74—750)

This invention relates to multiple speed hubs for bicycles and the like, and more particularly to a multiple speed hub in which changes in the transmission ratio of a planetary gearing interposed between the driven ratchet wheel or other input member and the shell of the hub can be altered by back pedaling.

The object of the invention is the provision of a multiple speed hub of the afore-described type which is reliable in its operation, yet relatively simple and inexpensive to manufacture.

Another object is the provision of such a hub which requires a minimum of space.

A further object is a hub which has relatively few and rugged motion transmitting parts so as to reduce wear and the cost of maintaining the hub in operating condition.

With these and other objects in view, the invention in one of its aspects consists in a hub arrangement in which a hub shell is mounted on a stationary shaft and rotatable thereon about the common axis. A driver member is rotatable forward or backward about the axis and is connected with planetary gearing which is also connected to the hub shell for alternatively rotating the same at a plurality of transmission ratios relative to the driver member. The gearing includes several meshingly engaged gear wheels which simultaneously rotate at different speeds.

The speed changing mechanism with which this invention is more particularly concerned, and which is responsive to backward rotation of the driver member for changing the transmission ratio of the gearing includes a coupling member which is rotatable and axially movable on the shaft between a first and a second axial position. The coupling member is prevented by suitable means from rotating in a backward direction relative to the shaft. A cam system is interposed between the driver member and the coupling member and transmits rotation of the latter in a forward direction to the coupling member, but axially moves the coupling member between its first and second positions when the driver member rotates backward. Motion transmitting means are interposed between the planetary gearing and the driver member and are connected to the coupling member in such a manner that rotary movement of the driver member is transmitted to one or another one of the gear wheels when the coupling member is in its first and second axial positions respectively.

Other features and many of the attendant advantages of this invention will be readily appreciated as the same becomes better understood by reference to the following detailed description when considered in connection with the accompanying drawings wherein.

Figure 1:
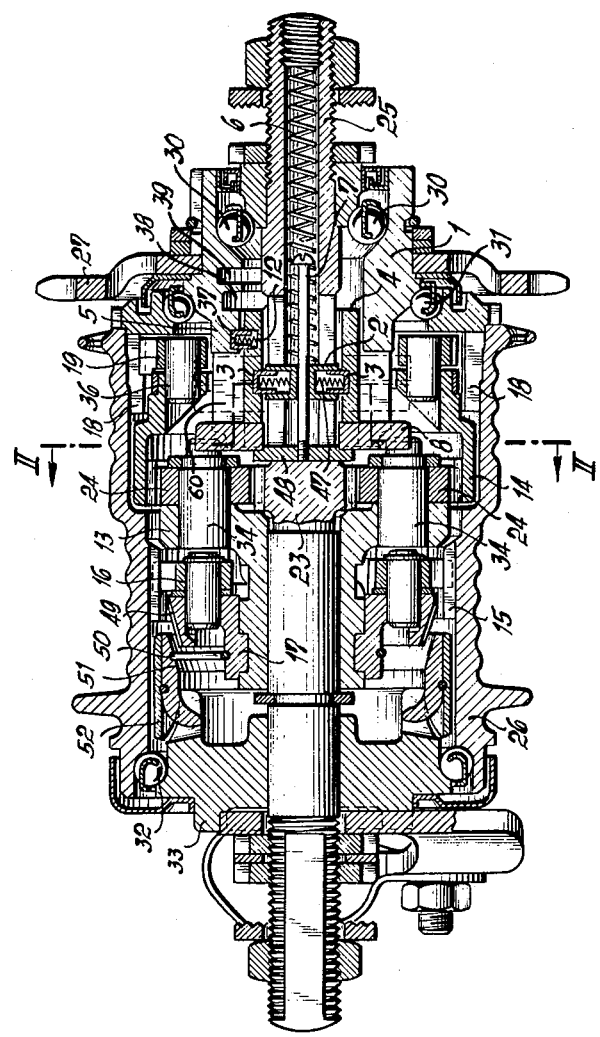
FIG. 1 shows a preferred embodiment of the hub of the invention in section on its axis.

Referring now to the drawing in detail, and initially to FIG. 1 there is seen a three-speed bicycle hub of conventional external appearance. The other elements of the hub are rotatably mounted on a stationary shaft 25 equipped to be fastened to the bicycle frame in the usual manner. A driver member 1 is rotatably secured on the shaft 25 by means of an interposed ball bearing 30, and carries a fixedly fastened drive sprocket 27. The driver member 1 constitutes an inner race of a ball bearing 31 which supports that axial end of a hub shell 26 which is nearer the sprocket 27 and will hereinafter be referred to as the drive end of the shell. A ball bearing 32 is interposed between the other axial end of the hub shell 26 and a bearing member 33 fixedly mounted on the shaft 25. The other axial hub shell end will be referred to hereinafter as the brake end, and other elements of the hub will be similarly referred to hereinafter to indicate axial positions or directions.

The hub shell 26 envelops planetary gearing arranged to permit the hub shell 26 to be driven by the sprocket 27 at three different relative speeds. The gearing includes a sun gear 23 integral with the shaft 25, a planet carrier 13 rotatable on the shaft, planet shafts 34 eccentrically mounted on the carrier 13, and planet wheels 24 rotatable on respective shafts 34 about axes spacedly parallel to the axis of the shaft 25 in simultaneous meshing engagement with the sun wheel 23 and a ring gear 14.

A coupling sleeve 4 is rotatable and axially slidable within a central cavity of the driver member 1. Axial movement of the sleeve 4 in the driver member 1 is actuated by a hollow pin 5 which is radially slidable in the sleeve 4 and selectively engageable with circumferential grooves 37, 38, 39 in the internal wall of the driver member 1 as will be described in more detail hereinafter. A helical spring 12 urges the pin 5 to move radially outward of the sleeve 4.

The brake end of the driver member 1 is axially slotted. Two drive arms 8 are axially guided in corresponding slots 60 of the driver member, and are held in axial abutment against the radial face on the brake end of the sleeve 4 by a member 48 which is axially slidable in a slot of the shaft 25 and is connected to a click carrier 2 by means of a rod 7 for joint axial movement. Clicks or pawls 3 on the carrier 2 are urged radially outward into engagement with an annular ratchet 28 on the inner face of the coupling sleeve 4 by springs 47 as better seen in FIG. 2. A helical spring 6 mounted within an axial bore of the shaft 25 permanently urges the click carrier 3 toward the brake end of the hub. The axially abutting engagement of the clicks 3 with the sleeve 4 causes the sleeve 4 to participate in any axial movement of the click carrier 2 and vice versa. The slidable member 48 similarly remains in sliding abutting contact with the drive arms 8 which in turn are held by the member 48 against the radial end face of the sleeve 4.

The ring gear 14 has an integral tubular extension projecting from the plane of engagement of the planet wheels 24 toward the drive end of the hub. Pivot pins 36 on the ring gear extension carry two pawls 19 which are urged by non-illustrated pawl springs into engagement with an internal ratchet rim 18 in the hub shell 26. The extension of the ring gear 14 has two slots arranged in a common axial plane and engageable by the drive arms 8 as indicated by outlines of the arms in broken lines. When the arms 8 move axially toward the drive ends of the respective slots, they engage oblique abutment faces on respective pawls 19 and swing the pawls out of engagement with the ratchet rim 18 against the restraining force of their pawl springs. The pawls 19 and the ratchet rim 18 thus constitute a one-way clutch which may be disengaged by axial movement of the arms 8.

The planet carrier 13 has an integral tubular extension which projects from the plane of engagement of the planetary gearing toward the brake end of the hub. It carries flat external double threads engaged by an internally threaded brake member 17. Two pawls 16 pivoted on the brake member 17 cooperate with another internal ratchet rim 15 on the hub shell 26 to form another one-way clutch between the planetary gearing and the hub shell.

An external conical face 49 of the brake member 17 is engaged with a corresponding internal face 51 of a slotted brake sleeve 52 when the brake member 17 moves axially toward the brake end of the hub on the threads of the planet carrier 13. The brake sleeve 52 is secured against rotation about the shaft 25 by engagement with the bearing member 33. A clamping spring 50 of hard drawn wire material forms an almost complete circle in an annular groove of the brake member 17, and has an end portion which projects radially from the groove into a slot of the brake sleeve 52.

Figure 2:
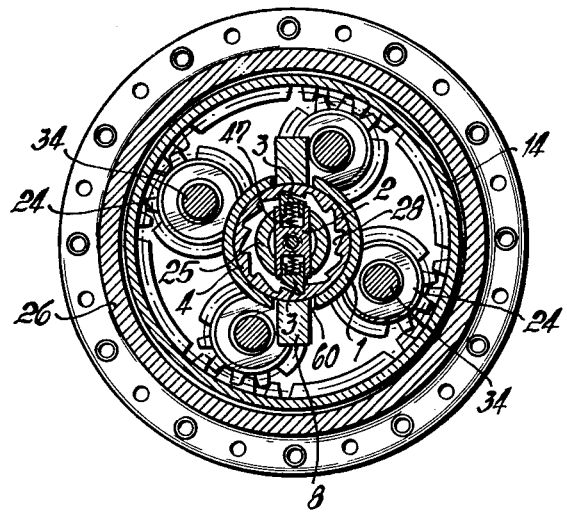
FIG. 2 shows the hub of FIG. 1 in radial section on the line II—II.

FIG. 2 which shows the hub of FIG. 1 in radial section on the line II—II, illustrates the hub shell 26 and the ring gear 14 in meshing engagement with the four planet wheels 24 which are mounted on respective shafts 34 and also engage the non-illustrated sun gear integral with the shaft 25. The click carrier 2 is secured against rotation in a slot of the shaft 25, and its clicks 3 engage an internal ratchet 28 on the coupling sleeve 4 in such a manner that the click carrier 2 must move axially with the sleeve 4, and that the latter is free to rotate counterclockwise, as viewed in FIG. 2, but cannot rotate in a clockwise direction. Counterclockwise rotation corresponds to the movement of the hub shell 26 about the shaft 25 during normal forward movement of the bicycle.

The drive arms 8 are axially slidable in slots 60 in the driver member 1. In the operative position illustrated in FIG. 2, the arms 8 abut circumferentially against respective shafts 34.

Figure 3:
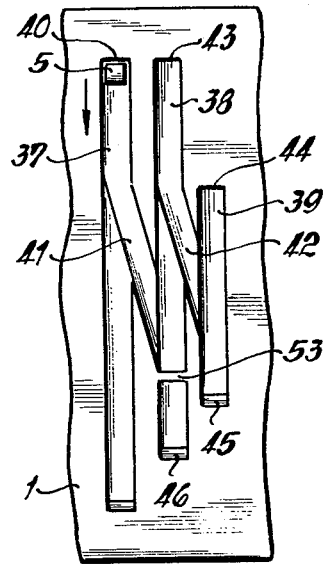
FIG. 3 is a developed view of the driver member of the hub of FIG. 1.

FIG. 3 is a developed view of the substantially cylindrical inner face portion of the driver member 1 which is formed with a cam track including the grooves 37, 38, 39. The grooves differ in radial depth, as shown in FIG. 1, the groove 37 being shallowest, the groove 39 deepest. They also differ in length. Those end faces 40, 43 of the grooves 37, 38 which are trailing end faces during normal forward pedaling as indicated by the arrow, extend in a common axial plane. The leading end face 46 of the groove 38, however, is circumferentially offset from the corresponding end face of the longer groove 37. The end face 46 is obliquely inclined and connects the bottom of the groove 38 with the cylindrical surface of the driver member 1. The shortest groove 39 has a trailing end face 44 in an axial plane, and an obliquely inclined leading end face 45.

Connecting grooves 41, 42 respectively deviate at an acute angle from the trailing end portions of the grooves 37, 38 and provide connections with the adjacent grooves 38, 39. The groove 37 increases in depth from the trailing end wall 40 to the junction with the connecting groove 41 the bottom of which continues at the same level. The leading remainder of the groove 37 is shallower so that a step is formed in the bottom of the groove 37 at the junction with the connecting groove 41. The latter groove in turn is somewhat shallower than the portion of the groove 38 with which it communicates. A step is formed in the groove 38 at its junction with the connecting groove 42 which in turn is shallower than the short groove 39. A transverse axial wall 53 separates the leading end portion of the groove 38 from the remainder of the groove and from the connecting grooves 41, 42. In the condition of the hub illustrated in FIGS. 1 to 3, the hollow pin 5, which is normally received in the cam track as a cam follower, abuts against the trailing end face 40 of the groove 37.

The afore-described bicycle hub operates as follows:

As illustrated in the drawing, the hub is set for its highest speed transmission ratio. The sprocket 27 which is driven by a chain in the usual manner rotates the driver member 1. Rotation of the latter is transmitted to the planet carrier 13 by the abutting engagement of the drive arms 8 with the shafts 34. As the planets revolve about the sun gear 23, the ring gear 14 is rotated faster about the axis of the hub than the sprocket 27. The hub shell 26 rotates with the ring gear 14 to which it is coupled by the first one-way clutch 18, 19. Since the internal ratchet 15 of the second clutch rotates faster than the pawls 16, the ratchet 15 overtravels the pawls 16.

Gear shifting from high speed to intermediate speed is effected by brief back pedaling. During forward pedaling, the hollow pin 5 moves with the driver member 1 because of its abutting engagement with the end wall 40, and the sleeve 4 therefore rotates with the driver member. During back pedaling, the coupling sleeve 4 is arrested by the clicks 3. The pin 5 thus is stopped while the driver member 1 moves in a direction opposite to the arrow in FIG. 3. The pin 5 which is urged toward the bottom of the cam track by the spring 12 thus travels away from the trailing end wall 40. Because of the afore-described step in the bottom of the groove 37, the pin 5 is deflected into the connecting groove 41, and eventually drops into the groove 38.

The axial movement of the pin 5 relative to the axially fixed driver member 1 causes a shift of the sleeve 4, the click carrier 2, the slidable member 48, and of the drive arms 8 toward the drive end of the hub against the force of the spring 6. The drive arms are disengaged from the planet shafts 34 and engage slots in the extension of the ring gear 14. When forward pedaling is resumed, the pin 5 abuts against the trailing end wall 43 of the groove 38, and power is transmitted from the sprocket 27 through the driver member 1, the drive arms 8, the ring gear 14, and the one-way clutch 18, 19 to the hub shell 26. The shell rotates at the same speed as the sprocket 27. The planet carrier 13 idles at a lower speed, and the ratchet rim 15 overtravels the pawls 16 of the second one-way clutch.

For a shift to low gear, the pin 5 is transferred to the trailing end wall 44 of the groove 39 by brief back pedaling in the same manner as described above. The drive arms 8 are moved axially closer toward the drive end of the hub as indicated in FIG. 1 in chain dotted lines. They engage the inclined abutment faces of the pawls 19 and thus disengage the first one-way clutch. Power is transmitted from the sprocket 27 to the hub shell 26 through the arms 8, the ring gear 14, the planet wheels 24, the planet carrier 13, the brake member 17, and the second clutch constituted by the pawls 16 and the ratchet rim 15.

Return to higher speeds from the low speed is again initiated by back pedaling. The pin 5 travels in a radial plane along the bottom of the groove 39 until it reaches the inclined leading end wall 45. As soon as the pin moves radially inward toward the hub axis to clear the side walls of the groove, the click carrier 2 together with the coupling sleeve 4 and the arms 8 is shifted by the spring 6 toward the brake end of the hub. The pin 5 moves from the top of the end wall 45 toward the left as viewed in FIG. 3, and drops into the leading end portion of the groove 38 between the transverse wall 53 and the end wall 46 under the urging of its spring 12, thereby preventing further axial movement of the coupling sleeve 4 and of associated hub elements by the spring 6. When forward pedaling is resumed, the pin 5 abuts against the transverse wall 53 in the groove 38, and the hub is driven at intermediate speed.

Upon brief back pedaling, the pin 5 leaves the groove 38 over the inclined leading end face 46, and is shifted toward the brake end of the hub by the spring 6 until it engages the groove 37 under the force of its spring 12. Upon forward pedaling, the high-speed position illustrated in FIGS. 1 to 3 is restored.

During forward pedaling, the friction of the stationary clamping spring 50 causes the brake member 17 to move threadedly on the planet carrier 13 toward the drive end of the hub and into the position illustrated in FIG. 1 in which further threaded movement of the brake member 17 is arrested by a non-illustrated abutment. The frictional engagement between the spring 50 and the brake member 17 tends to spread the spring. During back pedaling, the friction between spring and brake member tends to tighten the hold of the spring 50 on the brake member 17, and the brake member moves toward the left, as viewed in FIG. 1, that is, toward the brake end of the hub. The pitch of the threaded connection between the brake member 17 and the planet carrier 13 is selected with respect to the lengths of the grooves 37, 38, 39 to permit the afore-described speed changes by back pedaling without a corresponding movement of the brake member 17 which would cause braking engagement between the conical faces 49, 51 of the brake member 17 and of the brake sleeve 52.

The following speed changes are thus possible by back pedaling:

From high speed to intermediate speed, and thence to low speed. A return from intermediate to high speed is not possible.

From low speed to intermediate speed, and thence to high speed. A return from intermediate to low speed is not possible.

The extent of back pedaling is limited by engagement of the brake.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention set forth in the appended claims.

What is claimed is:

1. A multiple speed hub for a bicycle and the like, comprising, in combination:
   (a) a stationary shaft having an axis;
   (b) hub shell means mounted on said shaft and rotatable about said axis;
   (c) a driver member mounted on said shaft for rotation about said axis in a forward direction and in a backward direction;
   (d) planetary gearing operatively connected to said hub shell means and to said driver member for alternatively rotating said hub shell means at a plurality of transmission ratios relative to the rotation of said driver member, said gearing including a plurality of engaged gear wheel means simultaneously rotatable at different speeds; and
   (e) a speed changing mechanism responsive to rotation of said driver member in said backward direction for changing said transmission ratio of said gearing, said mechanism including:
      (1) a coupling member rotatable on said shaft about said axis and axially movable between a first and a second position;
      (2) means interposed between said shaft and said coupling member for selectively preventing rotation of said coupling member in said backward direction;
      (3) cam means interposed between said driver member and said coupling member for transmitting rotation of said driver member to said coupling member when said driver member rotates in said forward direction, and for moving said coupling member between said first and second axial positions thereof when said driver member rotates in said backward direction; and
      (4) motion transmitting means interposed between said driver member and said planetary gearing and responsive to the axial position of said coupling member for transmitting rotary movement of said driver member to one of said gear wheel means when said coupling member is in said first axial position thereof, and for transmitting rotary movement of said driver member to another one of said gear wheel means when said coupling member is in said second axial position thereof.

2. A hub as set forth in claim 1, wherein said cam means includes a cam track on said driver member and a cam follower member axially and circumferentially secured on said coupling member, said follower member being normally received in said track.

3. A hub as set forth in claim 2, wherein said cam track includes two circumferentially elongated grooves formed in said driver member, said grooves being axially spaced, and a connecting groove obliquely inclined relative to said axially spaced grooves and connecting said two grooves, said cam follower member being radially movable on said coupling member, and extending therefrom into said cam track.

4. A hub as set forth in claim 3, wherein said two spaced grooves each have a leading end portion relative to the direction of forward rotation of said driver member, the leading end portion of one of said spaced grooves extending circumferentially in a forward direction beyond the leading end portion of the other spaced groove, said other spaced groove having an obliquely inclined end wall, whereby said cam follower member is displaced radially outward of said other groove during backward rotation of said driver member; first resilient means permanently urging said cam follower member to move axially from said other spaced groove toward said one spaced groove; and second resilient means urging said cam follower member to move radially of said coupling member into said cam track.

5. A hub as set forth in claim 3, wherein said connecting groove is deeper than at least a portion of one of said spaced grooves, and said cam means further include yieldably resilient means for urging said cam follower means toward the bottom of the receiving groove.

6. A hub as set forth in claim 2, wherein said cam means further includes resilient means on said coupling member urging said cam follower member to move radially toward said driver member for being received in said cam track.

7. A hub as set forth in claim 1, wherein said means for selectively preventing backward rotation of said coupling member include pawl means secured against rotation on said shaft, and ratchet means on said coupling member and engaged by said pawl means.

8. A hub as set forth in claim 7, further comprising motion transmitting means connecting said pawl means and said coupling member for joint axial movement.

9. A hub as set forth in claim 8, further comprising resilient means mounted on said shaft and engaging said pawl means for urging axial movement of said coupling member.

10. A hub as set forth in claim 1, wherein said planetary gearing includes a planet carrier, and a ring gear rotatable about said axis, a sun gear fixed on said shaft, and a planet wheel in simultaneous meshing engagement with said sun gear and said ring gear, a planet wheel shaft on said planet carrier and rotatably carrying said planet wheel for rotation about an axis spaced from the axis of said stationary shaft, said motion transmitting means including arm means secured to said driver member for joint rotation about the axis of said shaft and secured to said coupling member for joint axial movement between a first position in which said arm means drivingly engages said planet carrier and a second position in which said arm means drivingly engages said ring gear.

11. A multiple speed hub for a bicycle and the like comprising, in combination:
   (a) a stationary shaft having an axis;
   (b) hub shell means mounted on said shaft and rotatable about said axis;
   (c) a driver member mounted on said shaft for rotation about said axis in a forward direction and in a backward direction;
   (d) planetary gearing including a plurality of engaged gear wheel means simultaneously rotatable at different speeds;

(e) two one-way clutch means respectively interposed between said hub shell means and two of said gear wheel means for rotation of said hub shell means, one of said clutch means being interposed between said hub shell means and one of said two gear wheel means which rotates faster than the other one of said two gear wheel means; and (f) a speed changing mechanism response to rotation of said driver member in said backward direction for changing the transmission ratio of said gearing between said driver member and said hub shell means, said mechanism including:

(1) a coupling member rotatable on said shaft about said axis and axially movable between a first, second, and third position;

(2) means interposed between said shaft and said coupling member for selectively preventing rotation of said coupling member in said backward direction;

(3) cam means interposed between said driver member and said coupling member for transmitting rotation of said driver member to said coupling member when said driver member rotates in said forward direction, and for moving said coupling member between two adjacent ones of said first, second, and third axial positions thereof when said driver member rotates in said backward direction; and (4) motion transmitting means interposed between said driver member and said planetary gearing, said motion transmitting means being responsive to the axial position of said coupling member for transmitting rotary movement of said driver member to one of said gear wheel means when said coupling member is in said first axial position thereof, for transmitting rotary movement of said driver member to another one of said gear wheel means when said coupling member is in said second and third axial positions thereof, and for disengaging said one clutch means when said coupling member is in said third axial position thereof.

12. A hub as set forth in claim 11, wherein said driver member is formed with three circumferentially elongated grooves each having a leading and a trailing portion relative to the direction of forward rotation of said driver member, and respective leading and trailing end walls in said portions, said grooves being axially spaced and each pair of axially adjacent ones of said grooves being connected by a connecting groove obliquely inclined relative to said three grooves, said grooves constituting elements of said cam means, said cam means further comprising a cam follower member radially guided in said coupling member and normally engaging one of said grooves, and resilient means radially urging said cam follower member into the engaged groove, the leading end walls of said grooves being circumferentially staggered, the leading end walls of a first groove and of an axially adjacent second groove being obliquely inclined for leading said cam follower member outward of the respective groove during backward rotation of said driver member, said cam means further including resilient means for permanently urging said cam follower member to move axially in a direction from said first groove toward said second groove and thence toward the third groove, and dividing wall means in said second groove for separating the leading portion thereof from the trailing portion, said connecting grooves communicating with said trailing portion of said second groove.

References Cited in the file of this patent

Schwerdhofer, German printed application, 1,037,891, Aug. 28, 1958.